United States Patent

[11] 3,586,938

| [72] | Inventor | Jean-Claude Le Gall<br>Rue des Bruyeres La Clarte-Ploumanach,<br>Perros-Guirec, France |
|---|---|---|
| [21] | Appl. No. | 32,182 |
| [22] | Filed | Apr. 27, 1970 |
| [45] | Patented | June 22, 1971 |
| [32] | Priority | Apr. 28, 1969 |
| [33] | | France |
| [31] | | 6913446 |

[54] PHASE-SENSITIVE SERVOMOTOR
8 Claims, 4 Drawing Figs.

[52] U.S. Cl. .................................................. 318/166,
318/49, 318/205, 310/112
[51] Int. Cl. .................................................. H02k 7/20
[50] Field of Search ............................................. 310/67,
112, 114; 318/49, 166, 205

[56] References Cited
UNITED STATES PATENTS

| 912,144 | 2/1909 | Mavor ........................ | 318/205 |
| 1,983,896 | 12/1934 | Bottcher ...................... | 310/112 X |
| 1,998,142 | 4/1935 | Meyertons ................... | 310/112 X |
| 2,448,374 | 8/1948 | Kent ............................ | 310/112 |

Primary Examiner—Gene Z. Rubinson
Attorney—Abraham A. Saffitz

ABSTRACT: AC energized servomotor having an angular response which is proportional to the phase of an input one-phase signal referred to the AC one-phase supply current. This servomotor includes two $p$-phase synchronous motors each comprising a first member bearing field windings and a second member bearing a magnetic armature cooperating with the field windings, one of the first and second members of one motor being held stationary and the other member being rotatable and both the first and second members of the other motor being rotatable. Means are provided for coupling together the rotatable member of the said one motor and either of the first and second members of the said other motor, and for deriving from the input one-phase signal an input $p$-phase signal and from the one-phase supply current a $p$-phase supply current. The field windings of the said one motor are energized by the p-phase supply current and the field windings of the said other motor by the servomotor input $p$-phase signal, so that the member of the said other motor which is not coupled to the rotatable member of the said one motor takes up an angular position proportional to the phase of the input one-phase signal.

PATENTED JUN22 1971

INVENTOR:
Jean-Claude LE GALL

By: *Abraham B Saffitz*
ATTORNEY

PHASE-SENSITIVE SERVOMOTOR

This invention relates to a servomotor in which the angular position of a rotating shaft is proportional to an input signal applied by an error detector.

Prior art step-by-step servomotors are known which, in association with pulse systems, are adapted to rotate through a given angle upon receipt of each pulse. These angular movements or "steps" can be either forwards or backwards, the direction being determined by the order in which the servomotor windings are energized. Reference can be made in this connection to an article by J. Jacquin and A. P. Morreale entitled "Théorie et utilization des moteurs pas-à-pas" in the periodical "L'Onde Electrique," Year 44, No. 445, Apr. 1964, pages 396—402.

The difference between step-by-step servomotors and servomotors embodying the invention is that the latter can rotate continuously to either hand through a given angle; in other words, they take up an angular position in response to an analog signal. However, if the input signal is quantized and corresponds to a small angle and if it is periodically repeated at time intervals which are sufficiently close together, the servomotor moves jerkily and behaves like a step-by-step, that is, a digital servomotor. Consequently, servomotors embodying the invention have the advantages of step-by-step motors as well as their own advantages.

In positional servosystems using conventional servomotors, the position is obtained by the first or second integration of the input signal.

It is well known that if a conventional electric motor such as an AC two-phase motor or a DC motor having a constant load is fed by a voltage $u$, the speed of the motor shaft is proportional to $u$, and the radial position of the shaft is proportional to the integral of $u$ with respect to time. It can be said that, as regards the radial position of the shift, an electric motor behaves as an integrator. In the case of a DC or AC torque motor, the acceleration of the shaft is proportional to the control signal and the position is proportional to the second integral of the control signal with respect to time. Consequently when it is desired to position a motor shaft proportionally to a control signal, it is necessary to include the motor in a servo loop. The motor drives for example the arm of a potentiometer whose output signal is substracted from the control signal to produce an error signal and this error signal is applied to the motor. The motor shaft turns until the potentiometer output signal becomes equal to the control signal.

In the case of the servomotors embodying the invention, as in the case of step-by-step motors, positional control is direct without any need for the normal integrations. The overall gain of the feedback chain can therefore be increased and positioning errors cancelled by integration placed as high as possible up the chain of action. As will be seen hereinafter, the angular movement $\alpha$ of a servomotor embodying the invention is produced by means of a phase-shifting system in cooperation with the energizing windings of the servomotor. Rotation of the phase-shifting system is controlled by the actual input signal, so that an auxiliary servo is required for which the conventional integrations referred to may be useful. Integration is therefore performed as high up the chain of action as possible. Reference can be made in this connection e.g. to the book by J. P. Gille, M. Pelegrin, and P. Decaulne entitled "Théorie et Techniques des asservissements," pages 304 to 305, Edition of 1956, published by Dunod-Paris.

According to the present invention, there is provided an AC-energized servomotor having an angular response which is proportional to the phase of an input signal referred to the AC supply, such servomotor including two two-phase synchronous motors each comprising a first member bearing field windings and a second member bearing a magnetic armature cooperating with the field windings, one of the first and second members of one motor being held stationary and the other member being rotatable and both the first and second members of the other motor being rotatable, means coupling together the rotatable member of the said one motor and either of the first and second members of the said other motor, and means for energizing the field windings of the said one motor by the AC supply and by the same AC in phase quadrature and for energizing the field windings of the said other motor by the servomotor input signal and by the same signal in phase quadrature, so that the member of the said other motor which is not coupled to the rotatable member of the said one motor takes up an angular position proportional to the phase of the input signal.

A servomotor embodying the invention comprises two synchronous two-phase motors which are preferably of the hysteresis or variable-reluctance kind.

More precisely, the mechanical connection between the two-phase synchronous motors can take four different forms:

1. The shaft of rotor $R_1$ of the first motor is rigidly secured to the shaft of the rotor $R_2$ of the second motor. The system $(R_1, R_2)$ can rotate when the two motors are energized simultaneously. The stator $S_1$ of the first motor is kept stationary. The stator $S_2$ of the second motor has a shaft around which the stator can rotate idly when the two motors are not energized.
2. The shaft of the first-motor rotor $R_1$ is rigidly secured to the shaft of the stator $S_2$ of the second motor, the system $(R_1, S_2)$ being adapted to rotate when the two motors are energized simultaneously. The first-motor stator $S_1$ remains stationary. The second-motor rotor $R_2$ can rotate idly when the two motors are not energized.
3. The first-motor stator $S_1$ has a shaft rigidly secured to the shaft of the second-motor rotor $R_2$. The system $(S_1, R_2)$ can rotate when the two motors are energized simultaneously. The first-motor rotor $R_1$ remains stationary. The second-motor stator $S_2$ has a shaft around which such stator can rotate idly when the two motors are not energized.
4. The stators $S_1$, $S_2$ have a common shaft around which they can rotate when both motors are energized. The first-motor rotor $R_1$ remains stationary. The second-motor rotor $R_2$ can rotate idly when the two motors are not energized.

The poles and therefore the energizing windings can be disposed either on the rotor or on the stator.

Whatever form of coupling is used:

a. The first motor is energized by two-phase current, one of the phases producing an energizing magnetic field. $H_0 \sin \omega t$ and the other an energizing magnetic field $H_0 \cos \omega t$.

The rotating part of the first motor (either $R_1$ or $S_1$) is therefore dependent upon a circular rotating field of angular velocity $\omega$ and value $H_0$.

b. The second motor is energized by two-phase current which has a phase shift of $\alpha$ from the two-phase current energizing the first motor. The phase shift is produced by a phase-shifting system in dependence upon the input signal to the servomotor.

The energizing magnetic fields are therefore of the form:
$H = H_0 \sin(\omega t + \alpha)$
$H' = H_0 \cos(\omega t + \alpha)$ The rotating part of the second motor (either $R_2$ or $S_2$) is therefore acted on by a circular rotating field of angular velocity $\omega$ and value $H_0$ and offset by the angle $\alpha$ from the rotating field of the first motor. Consequently, the rotating part of the first motor rotates in synchronism with the component $H_0$ of its rotating field, whereas the rotating part of the second motor, being rigidly secured to the rotating part of the first motor, rotates in synchronism with the component $H_0 \cos \alpha$ of its rotating field. The rotating part of the second motor, which can rotate idly when such motor is not energized, therefore rotates through the angle $\alpha$ to one or the other hand, depending upon the sign of $\alpha$ to compensate for this lag. In other words, when a phase shift $\alpha$ appears as a result of an input signal, this rotating part of the second motor experiences a mechanical torque: $C_m = k \sin \alpha$ which reduces with the angle $\epsilon$ through which the rotating part of the second motor rotates— i.e., the torque becomes: $C=k \sin(\alpha-\epsilon)$; since the torque disappears when $\epsilon=\alpha$.

If the servomotor receives no input signal, the rotating part concerned remains stationary; upon receipt of an input signal such part rotates through an angle $\alpha$ proportional to the input signal. The servomotor can therefore operate a member coupled with it.

In order that the invention may be clearly understood examples of servomotors embodying the invention will now be described in more detail with reference to the accompanying drawings, in which.

The servomotors now to be described are both of the fourth kind mentioned hereinbefore, that is, the two stators $S_1$, $S_2$ are rigidly secured to one another and can therefore rotate around the same axis. Rotor $R_1$ remains stationary and rotor $R_2$ rotates when the servomotor receives an input signal corresponding to an instruction.

In the first embodiment, the stationary rotor $R_1$ bears energizing windings and the movable rotor $R_2$ bears magnetic rings forming an armature conventional in hysteresis-type two-phase synchronous motors.

In the second embodiment, where the converse is the case, the moment of inertia of rotor $R_2$ is much greater than the moment of inertia of rotor $R_2$ of the first variant. Since the mechanical torques delivered by the two rotors $R_2$ are substantially identical, the first embodiment of servomotor has a high torque-to-moment-of-inertia ratio, whereas the second embodiment has a low torque-to-moment-of-inertia ratio. Since this ratio determines the time constant of the servomotor, constructions are provided to suit different problems.

Concluding these preliminary statements, the servomotors to be described hereinafter have motors having a single pole pair per phase. This is not a limitative feature; if it is required to use motors having $p$ pole pairs per phase, the positioning angle $\alpha$ of the load to be controlled is obtained by shifting through an angle $\alpha/p$ the phase of the two-phase currents energizing the two motors of the servomotor.

Figure 1:
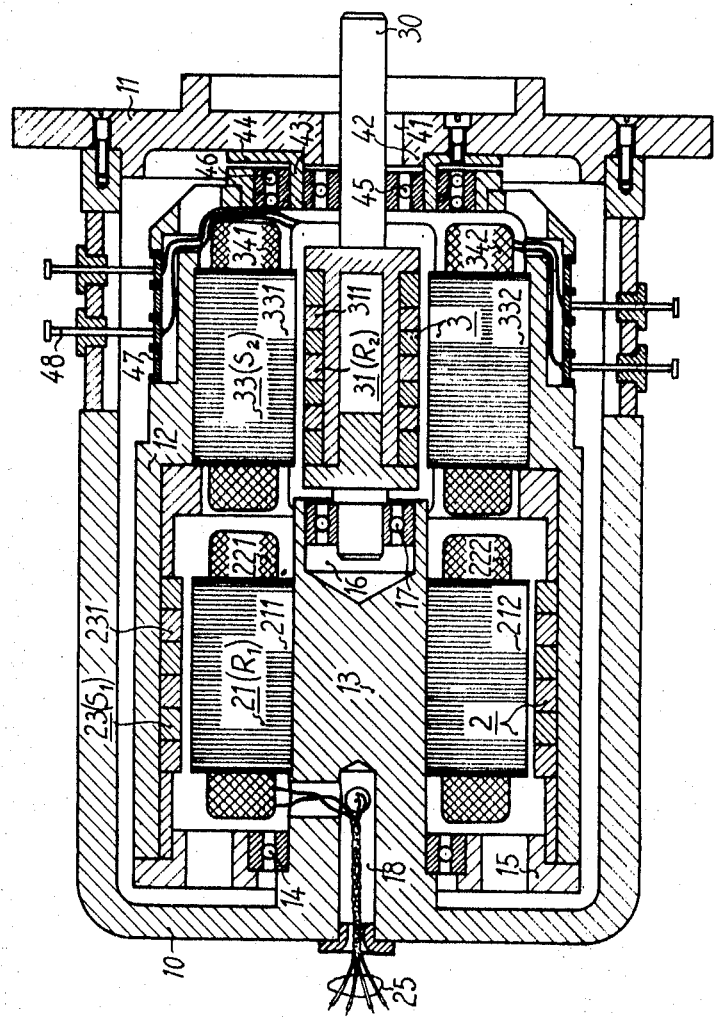
FIG. 1 is a sectional view of a first preferred embodiment of servomotor according to the invention.

FIG. 1 is a view in longitudinal section of the first embodiment of servomotor. A cylindrical casing 10 closed by an end plate 11 encloses two two-phase synchronous motors 2, 3 (2 denotes the motor $R_1$ $S_1$ mentioned earlier, and 3 denotes the motor $R_2$ $S_2$). The parts 10, 11 are required to mount the various bearings enabling a stator carrier 12 and a rotor 31 of motor 3 to rotate. A cylindrical rod 13 coaxial with casing 10 extends internally of the casing 10 from the end thereof and carries, near its root an antifriction bearing 14 which is force-fitted in a stator carrier end plate 15 and forms one of the bearings for the stator carrier 12. Centrally of its length the rod 13 bears a stationary rotor 21 of motor 2, such rotor comprising the two pole pairs, only one pair 211, 212 of which can be seen in FIG. 1, and two pairs of energizing windings, only a single pair 221, 222 of which can be seen in FIG. 1. At its free end the rod 13 is formed with a recess in which is received an antifriction bearing 17 forming one of the bearings for a shaft 30 of rotor 31. Rod 13 is also formed at its root with a central duct 18 communicating with the interior of casing 10 and serving as a conduit for wires 25 supplying the energizing windings 221, 222 which are shown and two other windings of motor 2, which are not shown.

End plate 11 is formed with a central circular aperture 41 through which the shaft 30 of rotor 31 extends. Extending around aperture 41 inside the casing 10 is an annular shoulder 42 on which is engaged a hollow cylindrical member 43 having an annular collar 44 applied to the flat wall of end plate 11. Disposed within member 43 is an antifriction bearing 45 which is the second bearing for shaft 30. Disposed outside member 43 is an antifriction bearing 46 which is the second bearing for the stator carrier 12. That part of carrier 12 which is associated with the stator 23 of motor 2 bears rings, such as 231, which are made of a special magnetic material and which form the armature of motor 2. That part of carrier 12 which is associated with the stator 33 of motor 3 has two pole pairs, only one pair 331, 332 of which can be seen in FIG. 1, and two pairs of energizing windings, only one pair 341, 342 of which can be seen in FIG. 1. The windings 341, 342 and the two energizing windings not visible in FIG. 1 are electrically connected, e.g. welded, to rings 47 which extend around the periphery of the stator carrier 12 and which are connected to an external electrical supply by brushes 48. Rotor 31 of motor 3 has rings, such as 311, which form its armature.

Figure 2:
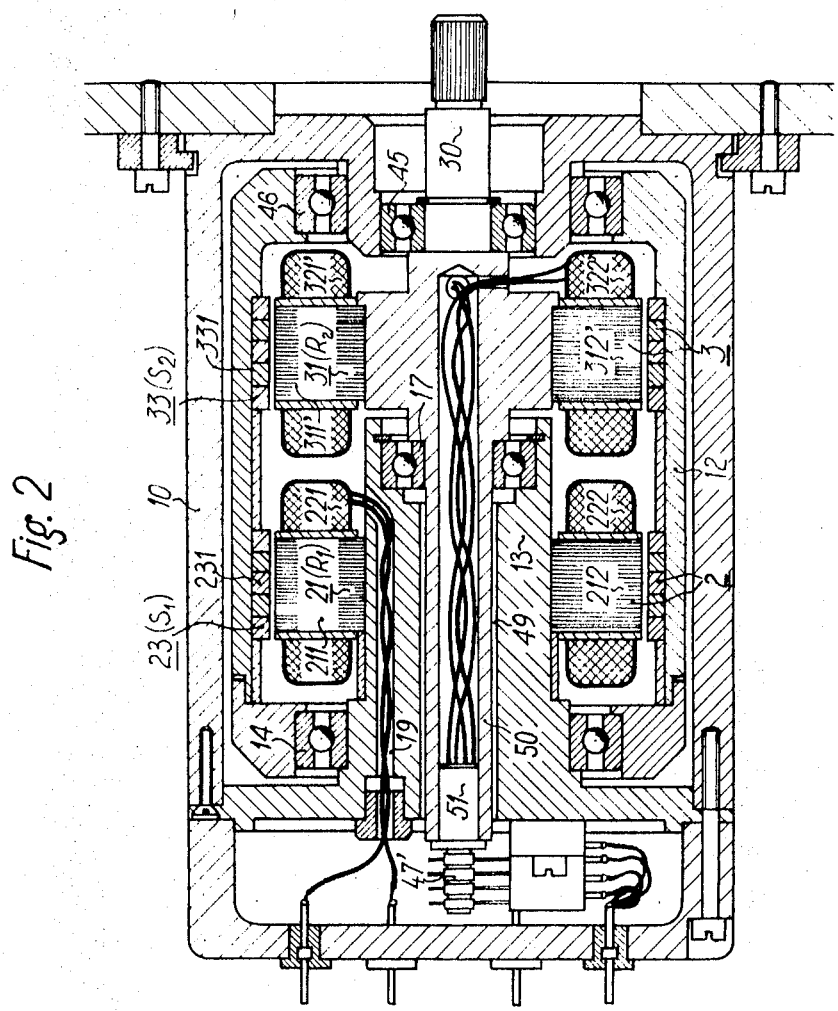
FIG. 2 is a sectional view of a second embodiment of servomotor according to the invention.

Referring now to FIG. 2, which shows the second embodiment of servomotor and in which like elements have the same reference numbers as in FIG. 1, rotor 31 of motor 3 has poles 311', 312' etc. and energizing windings 321', 322' etc., so that the arrangement used for the servomotor of FIG. 1 is different in some details. The right-hand part of the servomotor is basically similar to what is shown in FIG. 1. The left-hand part is different because arrangements must be made to energize the energizing windings 321', 322' etc. of motor 3, such windings now moving with the second motor shaft 30 and not with the stator carrier. Accordingly, a duct 19 in rod 13 is offset towards the periphery thereof, and a cylindrical duct 49 is formed along the axis of rod 13 and has engaged in it an extension 50 of the shaft 30, the extension 50 projecting out of the left-hand end of duct 49. Extension 50 is hollow and can thus receive supply wiring for the energizing windings 321', 322' etc. At the end of the shaft extension 50 the wiring goes through a plug 51, and that part thereof which projects carries rings 47' connected to the wiring. The external power supply is connected to the wiring by way of brushes which rub on the rings 47'.

Figure 3:
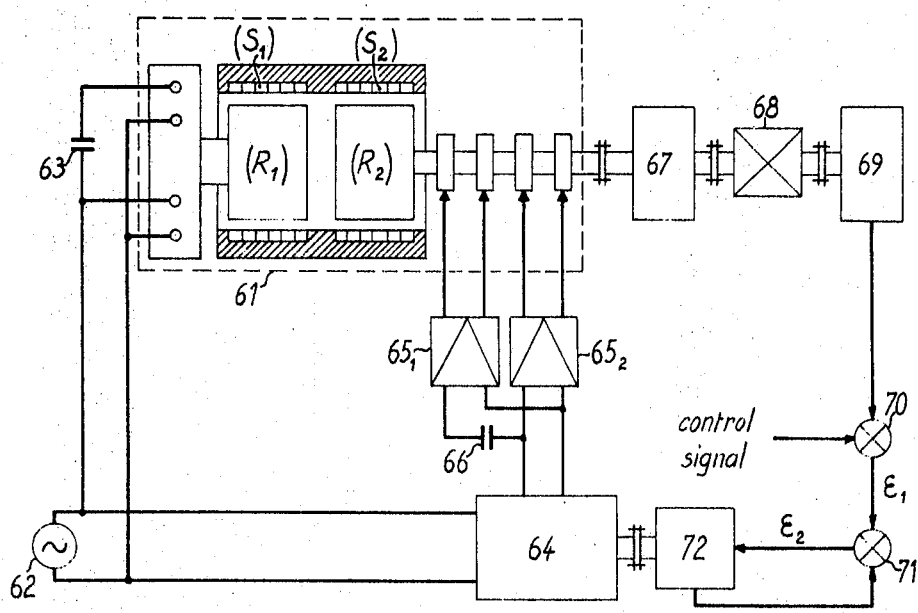
FIG. 3 is a block schematic diagram showing a servosystem using a servomotor embodying the invention.

FIG. 3 shows schematically an exemplary servosystem using a servomotor embodying the invention, that is, of the type of the second embodiment. A servomotor 61 is energized by a single-phase AC supply 62 which can be the supply mains. The supply 62 energizes the stationary rotor $R_1$ directly. By using a capacitor 63 in series with one of the energizing windings of rotor $R_1$, the same can receive a two-phase energization. The movable rotor $R_2$ is energized via a phase-shifting system 64 which, as described hereinafter, shifts the current energizing the rotor $R_2$ through an angle $\alpha$ upon receipt of an input signal corresponding to an instruction. The phase-shifted voltage delivered by the phase shifter 64 is applied to the energizing windings of rotor $R_2$ via two amplifiers $65_1$, $65_2$, the input circuit of amplifier $65_1$ being in series with a capacitor 66. The amplifiers $65_1$, $65_2$ help to equalize the two-phase voltages applied to the two rotors $R_1$, $R_2$.

A conventional geared speed reducer 67 provides a mechanical connection between the rotor $R_2$ and a load 68 the angular position of which it is required to control. A known kind of angular deviation detector 69 delivers a signal related to the instantaneous angular position of the load 68. Such signal is applied to one of the inputs of a comparator 70 whose other input receives a control signal related to the required angular position $\alpha$ of a load 68. The comparator 70 delivers an output in the form of an error signal $\epsilon_1$ which is applied to one of the inputs of a second comparator 71. The second comparator is associated with a servomechanism 72 which actuates the phase shifter 64 upon receipt of a signal from the comparator 70. Mechanism 72 comprises a tachydynamo which delivers an output signal which is applied to the second input of comparator 71. An error signal $\epsilon_2$ output by comparator 71 enables mechanism 72 to position phase shifter 64 appropriately.

Figure 4:
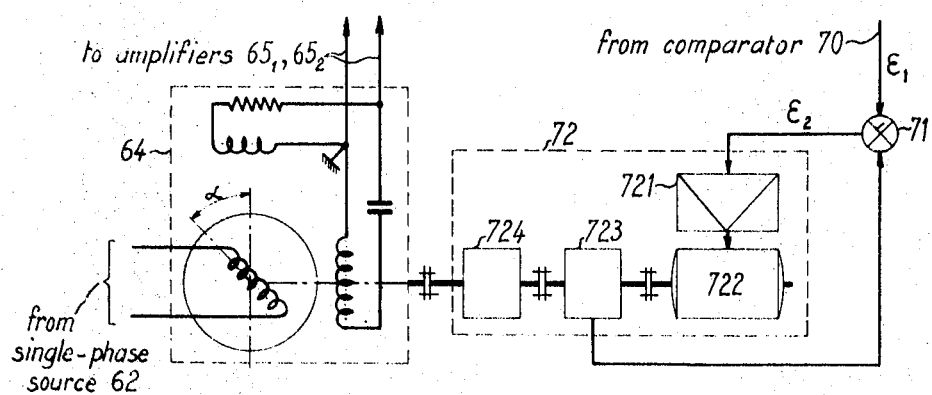
FIG. 4 illustrates the construction of the servomechanism for controlling the phase-shifter which phase-shifts the currents energizing one of the two motors forming the complete servomotor.

The construction of the servomechanism 72 controlling the phase shifter 64 is shown in FIG. 4.

The device known as a "coordinates transformer" or "resolver" makes a satisfactory phase shifter 64, and reference can be made in this connection to an article by J. Pandelle, C. A. de Cambray and B. Grancoin entitled "Les transformateurs de coordonnées" in the French periodical "L'Onde Electrique," Year 41, No. 412—413, July—Aug. 1961, pages 628—646.

The servomechanism 72 includes an amplifier 721 which amplifies the error signal $\epsilon_2$ delivered by comparator 71 to energize the energizing windings of one of the phases of a two-phase servomotor 722, the energizing windings of the other phase being energized by an appropriate source (not shown) in a known manner. A tachygenerator 723 actuated by servomotor 722 drives speed reducer 724 connected to an input shaft of the phase shifter 64 to effect the required phase shift.

What I claim is:

1. An AC energized servomotor having an angular response which is proportional to the phase of an input one-phase signal referred to the AC one-phase supply current, such servomotor including two $p$-phase synchronous motors each comprising a first member bearing field windings and a second member bearing a magnetic armature cooperating with the field windings, one of the first and second members of one motor being held stationary and the other member being rotatable and both the first and second members of the other motor being rotatable, means coupling together the rotatable member of the said one motor and either of the first and second members of the said other motor, means for deriving from the input one-phase signal an input $p$-phase signal and from the one-phase supply current a $p$-phase supply current, and means for energizing the field windings of the said one motor by the $p$-phase supply current and for energizing the field windings of the said other motor by the servomotor input $p$-phase signal, so that the member of the said other motor which is not coupled to the rotatable member of the said one motor takes up an angular position proportional to the phase of the input one-phase signal.

2. An AC energized servomotor as set forth in claim 1 including two two-phase synchronous motors in which the field windings of one motor are energized by the AC one-phase supply current and by the same AC current in phase quadrature and the field windings of the other motor are energized by the servomotor input one-phase signal and by the same signal in phase quadrature.

3. An AC energized servomotor as set forth in claim 1 in which the first member of the first motor bears field windings and is held stationary, the second member of said first motor bears a magnetic armature cooperating with said field windings and is rotatable, the first member of the second motor bears field windings and is rotatable and connected to the second member of the first motor and the second member of the second motor bears a magnetic armature cooperating with said magnetic field and is rotatable.

4. An AC energized servomotor as set forth in claim 1 in which the first member of the first motor bears field windings and is rotatable, the second member of said first motor bears a magnetic armature cooperating with said field windings and is held stationary, the first member of the second motor bears field windings and is rotatable and connected to the first member of the first motor and the second member of the second motor bears a magnetic armature cooperating with said magnetic field and is rotatable.

5. An AC energized servomotor as set forth in claim 1 in which the first member of the first motor bears field windings and is held stationary, the second member of said first motor bears a magnetic armature cooperating with said field windings and is rotatable, the first member of the second motor bears field windings and is rotatable and the second member of the second motor bears a magnetic armature cooperating with said magnetic field and is rotatable and connected to the second member of the first motor.

6. An AC energized servomotor as set forth in claim 1 in which the first member of the first motor bears field windings and is rotatable, the second member of said first motor bears a magnetic armature cooperating with said field windings and is held stationary, the first member of the second motor bears field windings and is rotatable and the second member of the second motor bears a magnetic armature cooperating with said magnetic field and is rotatable and connected to the first member of the first motor.

7. An AC energized servomotor as set forth in claim 1 wherein the $p$-phase synchronous motors are of the hysteresis kind.

8. An AC energized servomotor as set forth in claim 1 wherein the $p$-phase synchronous motors are of the variable-reluctance kind.